US006578901B2

(12) United States Patent
Sommer

(10) Patent No.: US 6,578,901 B2
(45) Date of Patent: Jun. 17, 2003

(54) PLUG AND METHOD OF USE THEREFOR

(75) Inventor: Karl L. Sommer, Rochester Hills, MI (US)

(73) Assignee: Llink Technologies, Romeo, MI (US)

( * ) Notice: Subject to any disclaimer, the term of this patent is extended or adjusted under 35 U.S.C. 154(b) by 0 days.

(21) Appl. No.: 09/888,163

(22) Filed: Jun. 22, 2001

(65) Prior Publication Data
US 2002/0195835 A1 Dec. 26, 2002

(51) Int. Cl.[7] ................................................. B60J 9/00
(52) U.S. Cl. ....................................................... 296/154
(58) Field of Search ......................................... 296/154

(56) References Cited
U.S. PATENT DOCUMENTS 2,821,429 A * 1/1958 Rantala
3,158,176 A * 11/1964 Toland
3,382,889 A * 5/1968 Heinz et al.
3,935,686 A * 2/1976 Dozois
5,873,623 A * 2/1999 Dunton et al.

* cited by examiner

Primary Examiner—D. Glenn Dayoan
Assistant Examiner—Scott Carpenter
(74) Attorney, Agent, or Firm—Dobrusin & Thennisch PC

(57) ABSTRACT

A plug for assisting in controlling the flow of one or more materials through an opening in a portion of an article of manufacture is disclosed. The plug may include a body portion for limiting the flow of one material through the opening. The plug may also include one or more support members for maintaining space between the portion of the article of manufacture and the body portion of the plug to allow flow of another material through the opening. In one preferred application, the plug is installed in an opening in a lower portion of a door of an automotive vehicle.

20 Claims, 3 Drawing Sheets

PLUG AND METHOD OF USE THEREFOR

TECHNICAL FIELD

The present invention relates to a plug for assisting in controlling flow of materials through an opening in a portion of an article of manufacture. More particularly, the present invention relates to a plug for placement in an opening in a lower portion of a door of an automotive vehicle wherein the plug is configured to limit flow of air through the opening while still allowing flow (e.g., drainage) of moisture, particulate or both through the opening.

BACKGROUND OF THE INVENTION

Plugs are generally designed to control the flow or movement of materials such as liquids, fluids or other materials through an opening. For certain applications, it may be desirable to allow flow of one material through an opening while limiting flow of another material through the opening. As an example, it may be desirable to allow accumulated moisture, particulate or both within an automotive vehicle door to drain out of an opening in a bottom portion of the door. However, it may also be desirable to limit flow of air through that opening when the vehicle is in motion such that undesirable noises (e.g., whistling or other noises) that may be caused by the flow of air are minimized or eradicated. Thus, there is a need for a plug that can limit the flow of one material through an opening while still allowing flow of a second material through the opening.

Additionally, the opening in the door or other article of manufacture may be located at or adjacent to a contoured surface of the door or article such that the plug may be required to adapt to the surface while still properly controlling flow through the opening. Thus, there is also a need for a plug that can adapt to contoured surfaces while still controlling flow of fluid or materials through the opening.

SUMMARY OF THE INVENTION

The present invention meets the above needs by providing a plug and a method of use therefore.

According to one aspect of the invention, there is provided a plug for controlling flow of materials through an opening in a portion of an article of manufacture. The plug includes a body portion for substantially overlaying the opening. The body portion includes at least one support member for contacting the portion of the article thereby maintaining space between the portion of the article and the body portion. The plug also includes a first fastening member connected to the body portion for maintaining the body portion in overlaying relation with the opening.

According to another aspect of the invention, there is provided a plug for an opening in a lower portion of a door of an automotive vehicle. The plug includes a body portion for substantially overlaying the opening to limit airflow through the opening. The body portion includes a central portion and at least one strip rotatably attached to the central portion. The body portion further includes at least one support member for contacting the lower portion of the door thereby maintaining space between the lower portion and the body portion for allowing moisture within the door to drain out of the opening in the lower portion. The support member is attached to the at least one strip. Furthermore, the plug includes a first and second fastening member connected to the body portion for maintaining the body portion in overlaying relation to the opening. The first and second fastening member are configured to extend through the opening for interferingly engaging the lower portion of the door.

According to yet another aspect of the invention, there is provided a method of using a plug within an opening in a lower portion of a door of an automotive vehicle. The method includes the steps of providing a body portion of the plug, the body portion including a first surface, a central portion, at least one strip rotatably attached to the central portion, and at least one support member attached to the at least one strip. The method further includes providing a first and second fastening member of the plug, the fastening members attached to the body portion of the plug. Moreover, the method includes extending the fastening members through the opening such that the body portion overlays the opening for limiting air flow through the opening and such that the support member contacts the lower portion of the door thereby maintaining space between the lower portion and the first surface to allow moisture within the door to drain out of the opening and such that the fastening members interferingly engage the lower portion of the door for maintaining the body portion in overlaying relation with the opening.

BRIEF DESCRIPTION OF THE DRAWINGS

These and other objects, features, aspects, and advantages of the invention will become apparent upon consideration of the specification and appended drawings in which.

DESCRIPTION OF PREFERRED EMBODIMENT

Figure 1:
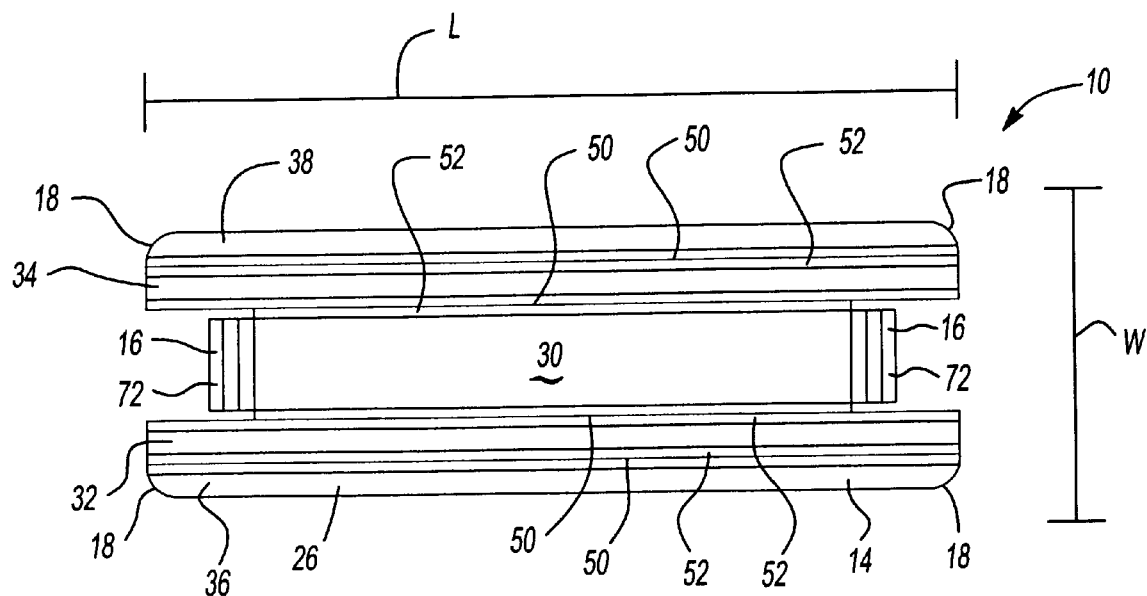
FIG. 1 illustrates a top view of an exemplary plug according to one embodiment of the present invention.
Figure 2:
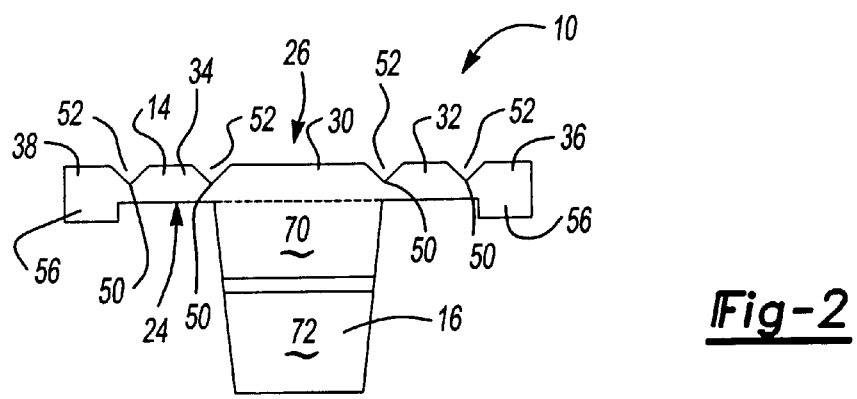
FIG. 2 illustrates a front view of the exemplary plug of FIG. 1.
Figure 3:
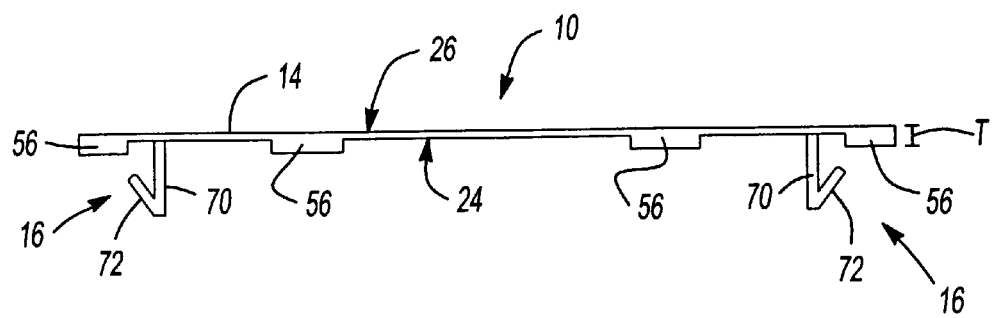
FIG. 3 illustrates a side view of the exemplary plug of FIG. 1.
Figure 4:
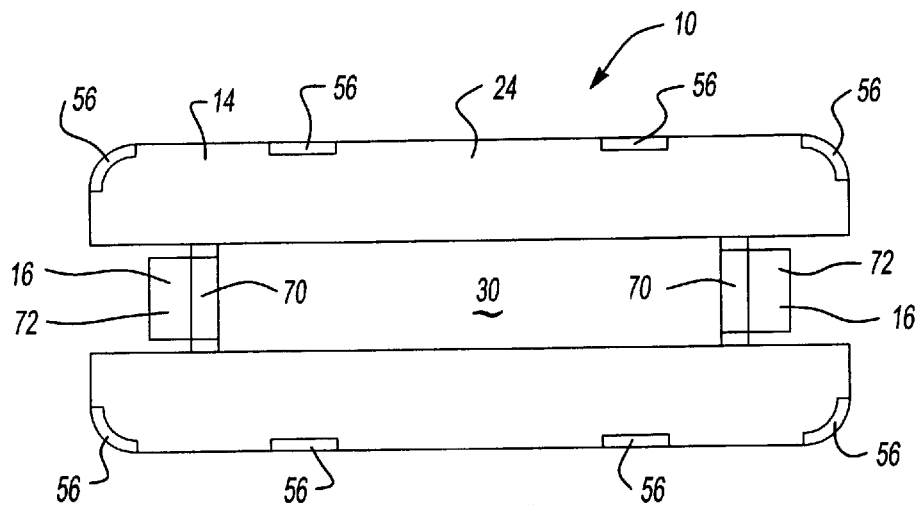
FIG. 4 illustrates a bottom view of the exemplary plug of FIG. 1.

The present invention generally provides a plug for assisting in controlling the flow of at least one material through an opening. In a preferred embodiment, the present invention provides a plug for limiting the flow of a first material through an opening while still allowing the flow of a second material through the opening. In a particularly preferred embodiment, the present invention provides a plug for limiting the flow of air through an opening in a lower portion of a door of an automotive vehicle while still allowing the drainage of moisture, particulate or both out of the opening. The term "plug" as used herein is meant to denote a member that assists in controlling flow of materials rather than a member that is merely designed to prohibit the flow of materials.

Referring to FIGS. 1 through 6, there is illustrated a preferred exemplary embodiment of a plug 10 for assisting in controlling flow of one or more materials through an opening 12. The plug is comprised of a body portion 14 designed to substantially cover at least a portion of the opening and at least one, but preferably two fastening members 16 configured to secure the body portion 14 adjacent the opening 12.

Preferably, the body portion 14 and the fastening members 16 are integrally formed as a single molded plastic plug 10, however, they may be separate components that fasten together. In a highly preferred embodiment, the plastic used to form the plug 10 is a thermoplastic or thermoset plastic and the plug 10 is formed by injection molding or reaction injection molding.

In the embodiment shown, the body portion 14 is generally rectangular with a length (L) and width (W) and rounded corners 18. Preferably, the body portion 14 includes a first surface 24 opposing a second surface 26 wherein the surfaces 24, 26 are separated by a thickness (T).

The body portion 14 is comprised of a central portion 30 and peripheral members 32–38. In the embodiment shown, the central portion 30 is a generally rectangular panel connected on one side to a first pair of peripheral members 32, 36 and on an opposing side to a second pair of peripheral members 34, 38. Preferably, the peripheral members 32–38 are in the form of elongated strips 32–38 and will be referred to as strips in the remainder of the application. In alternative embodiments however, other geometric configurations are contemplated as being within the scope of the present invention.

Each pair of strips 32–38 extends along the length (L) of the body portion 14. Additionally, each pair of strips 32–38 includes an inner strip 32, 34 that is rotatably connected to the panel portion 30 with a thinned portion 50 and an outer strip 36, 38 that is rotatably attached to the inner strip 32, 34 with another thinned portion 50. Preferably, the thinned portions 50 are formed by molding channels 52 having generally triangular cross-sections into the body portion 14 of the plug 10.

Additionally, the body portion 14 includes a plurality of support members 56 that extend away from and generally perpendicular to the first surface 24. Each of the support members 56 is attached to at least one of the rotatable strips 32–38. Preferably, each of the outer strips 36, 38 is attached to a set of four support members 56. Two of each set of four support members 56 are generally rectangular and are spaced apart along the length (L) of the body portion 14. The other two of each set of four support members 56 are curved and are attached to the outer strips 34, 38 adjacent the corners 18 at the ends of length (L) of the body portion 14.

The person of skill in the art will recognize that a variety of modifications may be made to the body portion 14 of the plug 10 without departing from the spirit and scope of the invention and appended claims. The body portion 14 may be provided in a variety of geometric configurations such as circular, oval, square or the like. The body portion 14 may include more or less strips 32–38 or more or less support members 56. The relative dimensions of the strips 32–38, the central portion 30 and the support members 56 may be altered depending on the material flow that the plug 10 is to control. The central portion 30 may be provided in a variety of geometric configurations such as circular, oval, square or the like. The central portion 30 may extend continuously, non-continuously, partially or fully between the strips 32–38. The strips 32–38 may be rotatably attached to the central portion 30 in an alternative manner (e.g., with fasteners) or by other suitable attachment mechanism. Additionally, the strips 32–38, the central portion 30 and the support members 56 may be integrally formed or molded as shown above or may be formed as separate components that are later attached to each other.

With continued reference to FIGS. 1–6, the fastening members 16 are attached to the body portion 14 in opposing relation to each other. Each of the fastening members 16 include a first generally rectangular portion 70 extending away from the body portion 14 and a second generally rectangular portion 72 extending away from the first rectangular portion 70. Preferably, the first rectangular portion 70 is generally perpendicular to the first surface 24 of the body portion 14 and the second rectangular portion 72 is disposed at an angle with respect to the first rectangular portion 70 such that the second rectangular portion 72 extends at least partially back toward the body portion 14. Also preferable, the first rectangular portion 70 extends away from the first surface 24 in generally the same direction as the support members 56.

In the embodiment shown, one of the first rectangular portions 70 is attached to one end of the central portion 30 while the other of the first rectangular portions 70 is attached to an opposite end of the central portion 30.

The person of skill in the art will recognize that a variety of modifications may be made to the fastening members 16 of the plug 10 without departing from the spirit and scope of the invention and the appended claims. In alternative embodiments, the plug 10 may be designed with only one fastening member 16 or more than two fastening members 16. One or both of the second portions 72 of the fastening members 16 may be disposed at different angles relative to the first portions 70 (e.g., the second portion 72 may be disposed at an angle with respect to the first portion 70 such that the second portion 72 extends substantially parallel to or even away from the first surface 24 of the body portion 14). The first and second portions 70, 72 may be provided in a variety of geometric configurations including clylindrical, square and the like. Additionally, the size, configuration and spacing of the fastening members 16 may be altered based upon the configuration of the opening and/or article of manufacture that the plug 10 will be installed into.

The plug 10 may be installed into openings in various portions of a variety of articles of manufacture. For convenience, the plug 10 will be discussed as being installed into the opening 12 in a lower portion 80 of a vehicle door (not shown) wherein the opening 12 extends through a first and second side 82, 84. However, the plug 10 should not be limited to uses in any particular article of manufacture or to any particular location within a vehicle door unless a particular claim under consideration so limits the plug 10.

Figure 5:
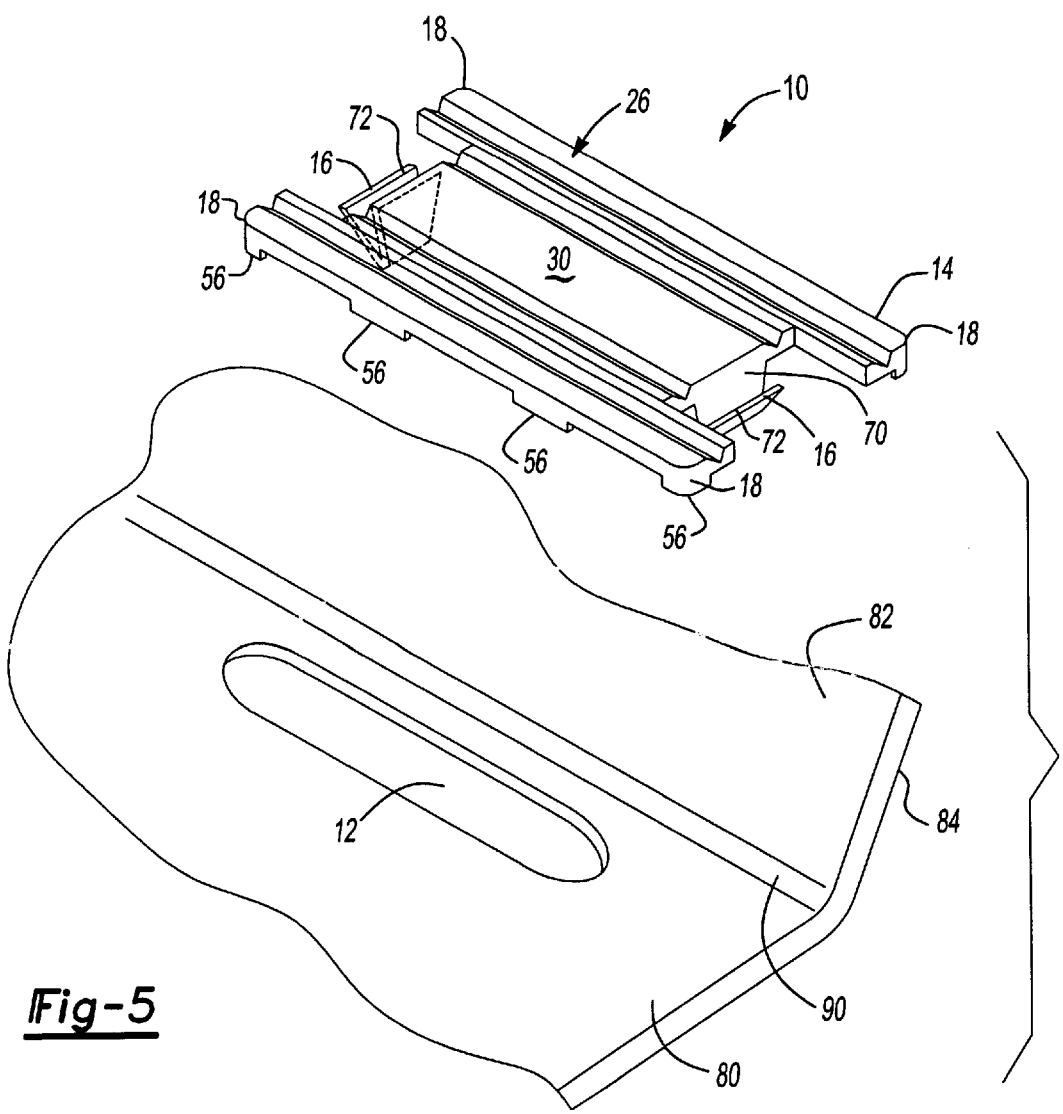
FIG. 5 illustrates a perspective view of the exemplary plug of FIG. 1 before installation into a portion of a door of an automotive vehicle.
Figure 6:
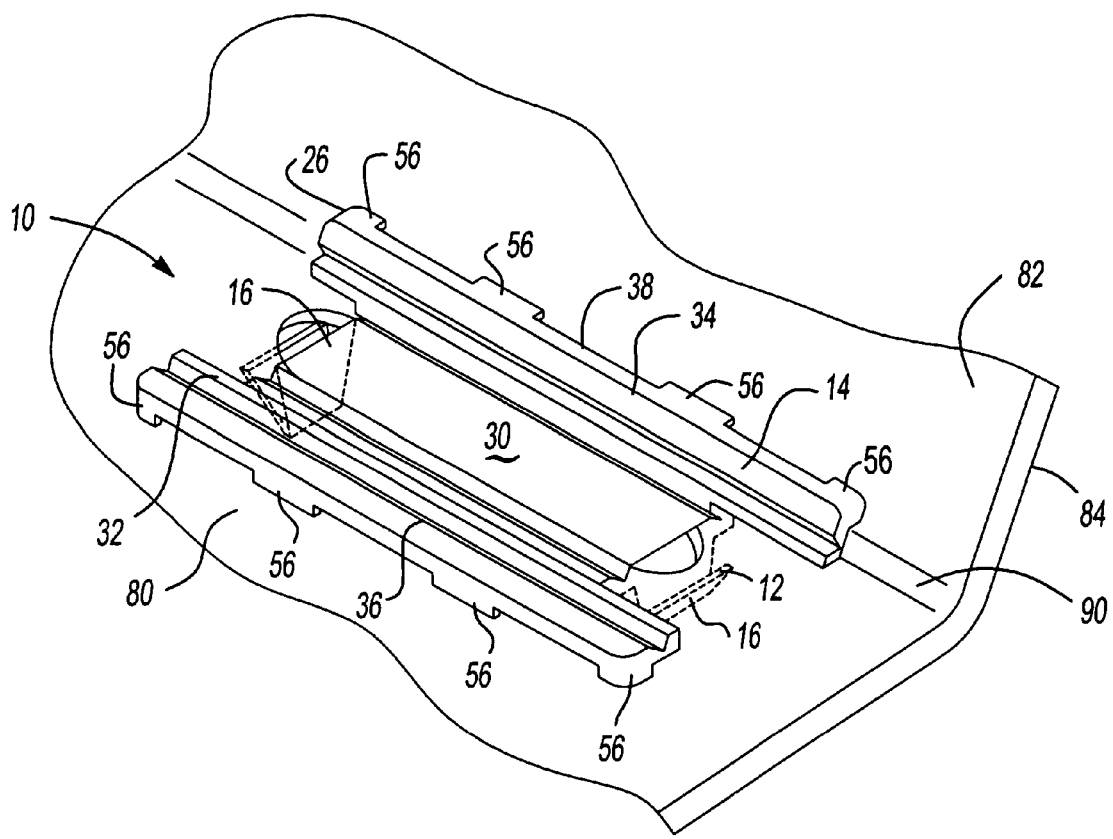
FIG. 6 illustrates a perspective view of the exemplary plug of FIG. 1 installed into the portion of the door of the automotive vehicle in FIG. 5.

Referring to FIGS. 1–6, but with particular attention to FIGS. 5 and 6, the plug 10 is installed into the opening 12 of the lower portion 80 of the vehicle door by pushing or otherwise extending the fastening members 16 through the opening 12. As the fastening members 16 are progressively extended further through the opening 12 during installation, the members 16 may be biased toward each other until the second portions 72 are through the opening 12. When both the second portions 72 are through the opening 12, the fastening members 16 can move away from each other such that the second portions 72 of the fastening members 16 interferingly engage the second side 84 of the lower portion 80 of the door. In a preferred embodiment, the fastening members 16 extend into an interior portion of the door leaving the body portion 14 of the plug 10 outside of the lower portion 80 of the door at a location where air is more likely to flow when the vehicle is in motion.

Once the plug 10 is installed into the opening 12 of the door, the first surface 82 of the body portion 14 substantially overlays the opening 12 and the fastening members 16 maintains the body portion 14 in overlaying relation with the opening 12. The first surface 24 and/or the body portion 14 overlays the opening 12 for limiting the amount of material (e.g., fluid, air or the like) that passes through the opening 12. At the same time, the support members 56 contact the first side 82 of the portion 80 of the door to maintain space between the body portion 14 (e.g., the first surface 24) and the first side 82 of the portion 80 of the door such that material (e.g. moisture, particulate or both within the door) can also pass or flow through the opening 12.

The skilled artisan will recognized that a preferred manner of installing the plug 10 of the present invention has been disclosed and that variations of installation may be used without departing from the spirit and scope of the invention and the appended claims. For example, one fastening member 16 may be extended through the opening 12 prior to the other fastening member 16 or only one fastening member 16 may be used.

Advantageously, as seen best in FIG. 6, the thinned portions 50 allow the strips 32–38 to rotate relative to the central portion 30 such that the body portion 14 of the plug 10 can adapt or conform to a contoured or curved surface 90 of the door. Additionally, the opening 12 can extend through the contoured or curved surface 40, if desired, and the plug 10 is still effective. Thus the plug 10 may be used in locations where other plugs might be ineffective.

It should be understood that the invention is not limited to the exact embodiment or construction, which has been illustrated and described but that various changes may be made without departing from the spirit and the scope of the invention.

What is claimed is:

1. A plug for controlling flow of materials through an opening in a lower portion of a door of an automotive vehicle, the plug comprising:
    a body portion for substantially overlaying the opening to limit air flow through the opening, the body portion having a length, the body portion including;
        i) a first surface opposite a second surface, the first surface configured to face the opening, the second surface defining at least one channel extending along the length of the body portion;
        ii) a central portion and a first peripheral member wherein the at least one channel is between the first peripheral member and the central portion; and
        iii) at least one support member extending from the first surface of the body portion; and
    a first and second fastening member extending away from the first surface of the body portion for maintaining the body portion in overlaying relation to the opening, the first and second fastening member configured to extend through the opening for interferingly engaging the lower portion of the door;
    wherein the at least one support member is for contacting the lower portion of the door such that the at least one peripheral member rotates relative to the central portion thereby maintaining space between the lower portion and the body portion for allowing moisture within the door to drain out of the opening and wherein the at least one channel assists in allowing the peripheral member to rotate relative to the central portion.

2. A plug as in claim 1, wherein the peripheral member rotates to allow the body portion to adapt to a contoured surface of the lower portion of the door.

3. A plug as in claim 2, wherein the support member is attached to the peripheral member.

4. A plug as in claim 1, wherein the first fastening member includes a first portion extending at least partially away from the body portion and a second portion extending at least partially back toward the body portion, the first portion configured to extend through the opening.

5. A plug as in claim 2, wherein the body portion and the first fastening member are integrally molded as a plastic part.

6. A plug as in claim 5, wherein the peripheral member and the central member are attached to each other by a thinned plastic portion that adjoins the at least one channel.

7. A plug as in claim 6, wherein the at least one channel is triangular shaped in cross-section.

8. A plug for controlling flow of materials through an opening in a lower portion of a door of an automotive vehicle, the plug comprising:
    a generally rectangular body portion for substantially overlaying the opening to limit air flow through the opening, the body portion having a length and a width, the body portion including;
        i) a first surface opposite a second surface, the first surface being generally smooth for facing the opening of the door, the second surface defining a first channel and a second channel both extending along the length of the body portion;
        ii) a central portion, a first strip and a second strip wherein the first channel is between the first strip and the central portion and the second channel is between the second strip and the central portion and wherein the first channel and second channel respectively assist in allowing the first strip and the second strip to rotate relative to the central portion; and
        iii) a first support member and a second support member extending from the first surface of the body portion wherein the first support member and the second support member are for contacting the lower portion of the door thereby maintaining space between the lower portion and the body portion for allowing moisture within the door to drain out of the opening; and
    a first and second fastening member extending away from the first surface of the body portion for maintaining the body portion in overlaying relation to the opening, the first and second fastening member configured to extend through the opening for interferingly engaging the lower portion of the door.

9. A plug as in claim 8, wherein the first and second fastening member each include a first portion extending at least partially away from the body portion and a second portion extending at least partially back toward the body portion, the first portion configured to extend through the opening.

10. A plug as in claim 9, wherein the body portion and the first and second fastening member are integrally molded as a plastic part.

11. A plug as in claim 10, wherein the first strip and the central member are attached to each other by a thinned plastic portion that adjoins the first channel.

12. A plug as in claim 8, wherein the second fastening member is in generally opposing relation with the first fastening member.

13. A plug as in claim 12, wherein the first channel is triangular shaped in cross-section.

14. A plug as in claim 13, wherein the first strip is rotatably attached to a first side of the central portion and the second strip is attached to a second side of the central portion and the first side is opposite the second side.

15. A method of using a plug within a door of an automotive vehicle, the method comprising the steps of:

providing a lower portion of the door of the automotive vehicle, the lower portion defining an opening the lower portion being contoured adjacent the opening;

providing a body portion of the plug overlaying the opening to limit air flow through the opening, the body portion including;
  i) a first surface opposite a second surface, the first surface being substantially smooth, the second surface defining a first channel and a second channel both extending along the length of the body portion;
  ii) a central portion, a first strip and a second strip wherein the first channel is between the first strip and the central portion and the second channel is between the second strip and the central portion; and
  iii) a first support member and a second support member extending from the first surface of the body portion;

providing a first and second fastening member of the plug, the fastening members attached to the body portion of the plug and extending from the first surface of the plug; and extending the fastening members through the opening such that;
  i) the body portion overlays the opening with the first surface of the body portion facing the opening for limiting air flow through the opening;
  ii) the support members contact the lower portion of the door causing the first and second strips to rotate relative to the central portion thereby maintaining space between the lower portion and the first surface to allow moisture within the door to drain out of the opening;
  iii) the fastening members interferingly engage the lower portion of the door for maintaining the body portion in overlaying relation with the opening; and
  iv) the first channel and second channel respectively assist in allowing the first strip and the second strip to rotate relative to the central portion as caused by the support members contacting the lower portion of the door.

16. A method as in claim 15, wherein the first and second fastening member each include a first portion extending at least partially away from the body portion and a second portion extending at least partially back toward the body portion, the first portion configured to extend through the opening.

17. A method as in claim 16, wherein the body portion and the first and second fastening member are integrally molded as a plastic part.

18. A method as in claim 17, wherein the first strip is rotatably attached to a first side of the central portion and the second strip is attached to a second side of the central portion and the first side is opposite the second side.

19. A method as in claim 15, wherein the second fastening member is in generally opposing relation with the first fastening member.

20. A method as in claim 19, wherein the first channel and the second channel are triangular-shaped in the cross-section.

* * * * *